United States Patent [19]
Yamashita et al.

[11] Patent Number: 5,335,317
[45] Date of Patent: Aug. 2, 1994

[54] METHOD AND APPARATUS FOR DISPLAYING THREE DIMENSIONAL PHYSICAL QUANTITY

[75] Inventors: Junichi Yamashita; Hideo Soneda; Satoshi Sugawara, all of Hitachi, Japan

[73] Assignee: Hitachi, Ltd., Tokyo, Japan

[21] Appl. No.: 676,388

[22] Filed: Mar. 28, 1991

[30] Foreign Application Priority Data

Mar. 28, 1990 [JP] Japan .................................. 2-76743

[51] Int. Cl.⁵ .............................................. G06F 15/72
[52] U.S. Cl. .................... 395/119; 395/140; 364/578; 364/550
[58] Field of Search ............... 395/119, 140, 124, 161, 395/120, 123; 364/578, 550, 556

[56] References Cited

U.S. PATENT DOCUMENTS

| | | | |
|---|---|---|---|
| 4,558,438 | 12/1985 | Jones et al. | 395/119 X |
| 4,685,070 | 8/1987 | Flinchbaugh | 395/124 |
| 4,719,585 | 1/1988 | Cline et al. | 395/124 |
| 4,879,668 | 11/1989 | Cline et al. | 395/124 |
| 4,914,589 | 4/1990 | Crawford | 395/124 X |

OTHER PUBLICATIONS

Upson et al., "The Application Visualization System: A Computational Environmental for Scientific Visualization", IEEE Computer Graphics & Applicatiions, Jul. 1989, pp. 30–42.

Primary Examiner—Raymond J. Bayerl
Attorney, Agent, or Firm—Antonelli, Terry, Stout & Kraus

[57] ABSTRACT

When a spatial distribution of a physical quantity to be displayed is given, a value range showing the three-dimensionally distributed physical quantity is divided into a plurality of small value ranges to obtain the distribution of the spatial positions where the physical quantity has the value equal to that in the small value range for every small value range to display the physical quantity, and to repeat the operation by successively changing the small value range.

7 Claims, 5 Drawing Sheets

METHOD AND APPARATUS FOR DISPLAYING THREE DIMENSIONAL PHYSICAL QUANTITY

BACKGROUND OF THE INVENTION

The present invention relates to a display method for a three dimensional physical quantity and a device therefor.

A method for transferring information having different kinds of characters using a color cathode-ray tube display device in conjunction with a computer is well known. An example of such a method in which a device using a specific process for displaying a process condition with some patterns prepared beforehand and colors selected automatically depending on the condition at that moment is disclosed in the method shown in JP-B-52-21858 (1977). In this conventional art, values on an arbitrary plane of a display of a reactor core relating to physical quantities in a nuclear power plant or a thermal power plant such as output, temperature and neutron flux in the reactor core are caused to be displayed by a color code according to the values thereof. Further, in the distribution indication device for interspatial variables disclosed in JP-A-62-128377 (1987) a sliced plane within a three dimensional space is selected, and distribution of variable values on the sliced plane is obtained to display the same. The sliced plane is successively changed so as to obtain distribution of the three dimensional physical quantity.

On the other hand, an example of common display methods for a three dimensional body is disclosed in JP-A-60-217461 (1985) in which relative distances of respective bodies in the three dimensional space are displayed on a two dimensional display according to lightness and saturation of color.

In the above described art JP-B-52-21858 (1977) and JP-A-62-128377 (1987), since physical quantity is displayed after designation of a sliced plane, it is difficult to compare the physical quantity of a sliced plane previously displayed with a physical quantity of a currently displayed sliced plane, since, for performing the comparison, it is necessary to designate a new sliced plane including both positions to be subjected to the comparison and thereafter to perform the display. There is a further problem in that the physical quantity to be displayed may be increased. Further by these methods the intuitive grasp thereof in the three dimensional space is difficult.

On the other hand, the method disclosed in JP-A-60-217461 (1985) expresses the relative distances of three dimensional bodies by using the three dimensional structure of color (lightness, saturation and hue) and the distribution of physical quantity in the three dimensional space is not easily intuitively and momentarily grasped.

SUMMARY OF THE INVENTION

An object of the present invention is to provide a display method for a three dimensional physical quantity and a device therefor for displaying distribution of the three dimensional physical quantity efficiently without using sliced planes, in a form easily comprehended by sight.

For achieving the above object, when a spatial distribution of physical quantity to be displayed is given, the present invention divides a value range of the physical quantity into a plurality of small value ranges, to obtain the distribution of the spatial positions where the physical quantity has the value equal to that in the small value range for every small value range to display the same, and to repeat the above operation by successively changing the small value range.

By successively changing the small value range so as to monotonously increase or decrease the physical quantity, when the display of the spatial distribution for one small value range finishes, by shifting to the next small value range after erasing the same or by shifting to the next small value range without erasing the same, total visual comprehension of the three dimensional physical quantity distribution can be intuitively performed. Further, since the necessity of repeating the processing of setting slice planes and thereafter obtaining the distribution is eliminated and physical quantities at desired positions can also be immediately read or compared, the display processing time can thereby be greatly decreased.

DETAILED DESCRIPTION OF THE PREFERRED EMBODIMENTS

Figure 1:
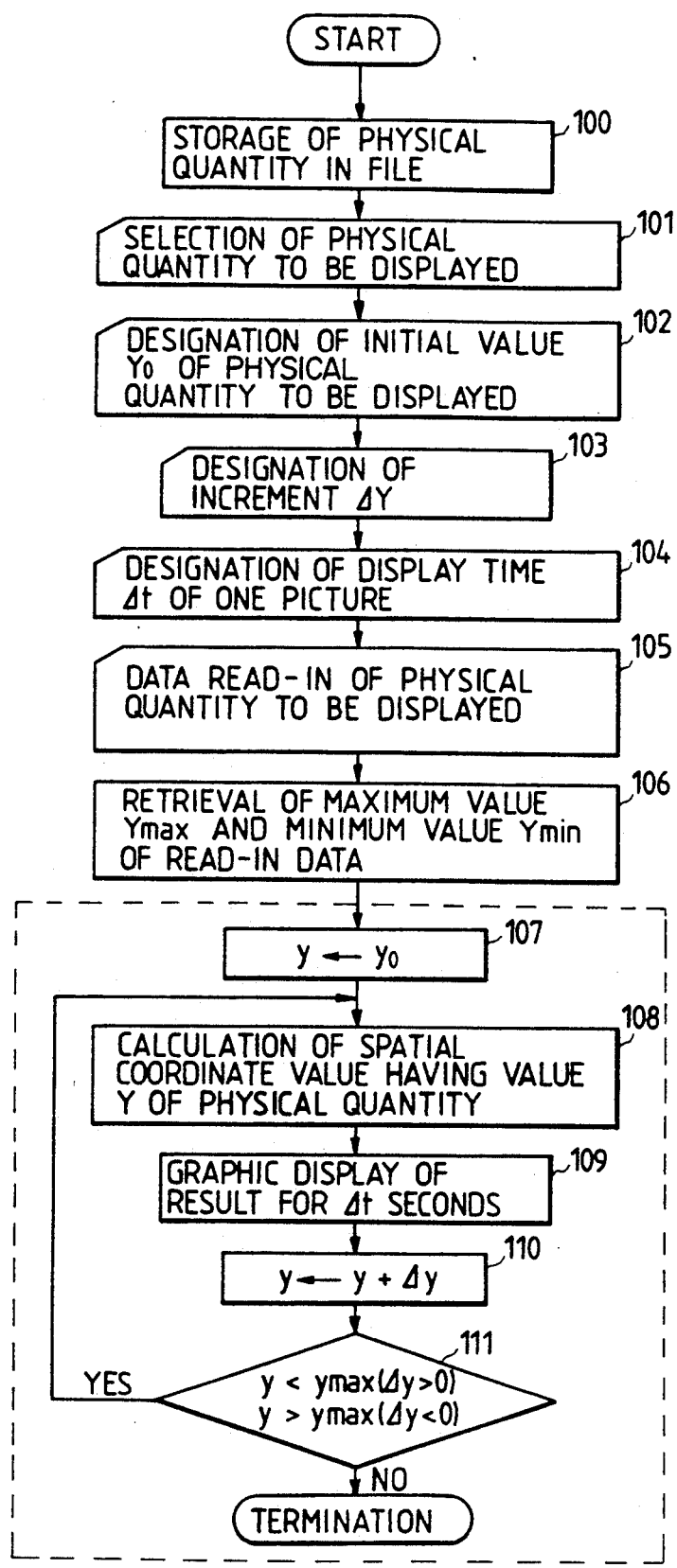
FIG. 1 is a flowchart showing a first embodiment of a display processing using a method according to the present invention.

Hereinbelow, the present invention is explained with reference to various embodiments. FIG. 1 is a flowchart of a processing system for realizing the display method of the present invention. First, physical quantity of an object physical system is stored into a file (step 100). The physical quantity can be, as examples only, data output from a plant and data processed thereof by a computer, or simulation results. Next, a user designates one of physical quantities to be displayed, for example, such as reactor core output, temperature, pressure, void rate, neutron flux and heat flux in a reactor core of a nuclear reactor (step 101). Assuming the physical quantity just designated is $\phi$, $\phi$ depends on a spatial coordinate R. Next, the value of the physical quantity $\phi$ at the time the display is started, namely the initial value $Y_o$ of the physical quantity $\phi$ on a display screen, the display time $\Delta t$ on the screen and the increment $\Delta Y$ of the next value $\phi$ being displayed after $\Delta t$ seconds are designated (step 102-104). By these designated values, the user finishes the designation work, a computer or a graphic device which executes this processing fetches data of the physical quantity $\phi$ to be displayed from the file (step 105), and the maximum value $Y_{max}$ and the minimum value $Y_{min}$ of the data are obtained (step 106). Further, in this step, when the three dimensional physical quantity is desired to be displayed by colors, the physical quantity defined by the maximum value and the minimum value is divided into groups and the colors are allocated corresponding to the respective divided ones.

After the above preparatory processing is completed, display processing 1 according to the present embodiment is performed. First, initial value YO of $\phi$ to be displayed is substituted into work variable Y (step 107) and positional coordinates in the three dimensional space having the value Y are obtained (step 108). The physical quantity values Y fetched in the step 105 are the values given at the respective mesh points in the objective spatial coordinate system and are scattered. This calculation is for obtaining positional coordinates which are assumed to have the value Y desired to be displayed by properly interpolating between the values on the respective mesh points. In the next step 109, all of the coordinates having the value Y thus obtained are displayed on the screen for $\Delta t$ seconds. However, in this instance, since the coordinates having the value Y are the coordinate values in the three dimensional space, it is necessary to convert these values into the two dimensional display coordinate system suitable for the display. Further in this instance, by displaying one or a plurality of closing curved planes by connecting two dimensional coordinate positions to be displayed with lines and coloring the surface of the closing curved planes, the interspatial distribution of the value Y of the physical quantity $\phi$ can also be easily comprehended. After finishing the display of this initial value $Y_o$ for $\Delta t$ seconds, the display is erased, and by renewing the value of Y into $Y+\Delta Y$ (step 110) a spatial distribution display is performed in the same manner as set forth above. This screen image is also erased after displaying for $\Delta t$ seconds and this operation is repeated until the value of Y reaches $Y_{max}$. The termination judgment is performed in a step 111. According to the present embodiment, the distribution of $\phi$ in the three dimensional space can be easily and intuitively comprehended by continuously changing the value Y enabling display of the three dimensional spatial distribution of the physical quantity $\phi$. Further in the above embodiment, while the user inputs and sets the screen image display time $\Delta t$ so that thereafter the screen image automatically changes at every $\Delta t$ seconds, the user may input the time at every one display by such as a switching operation.

Figure 2:
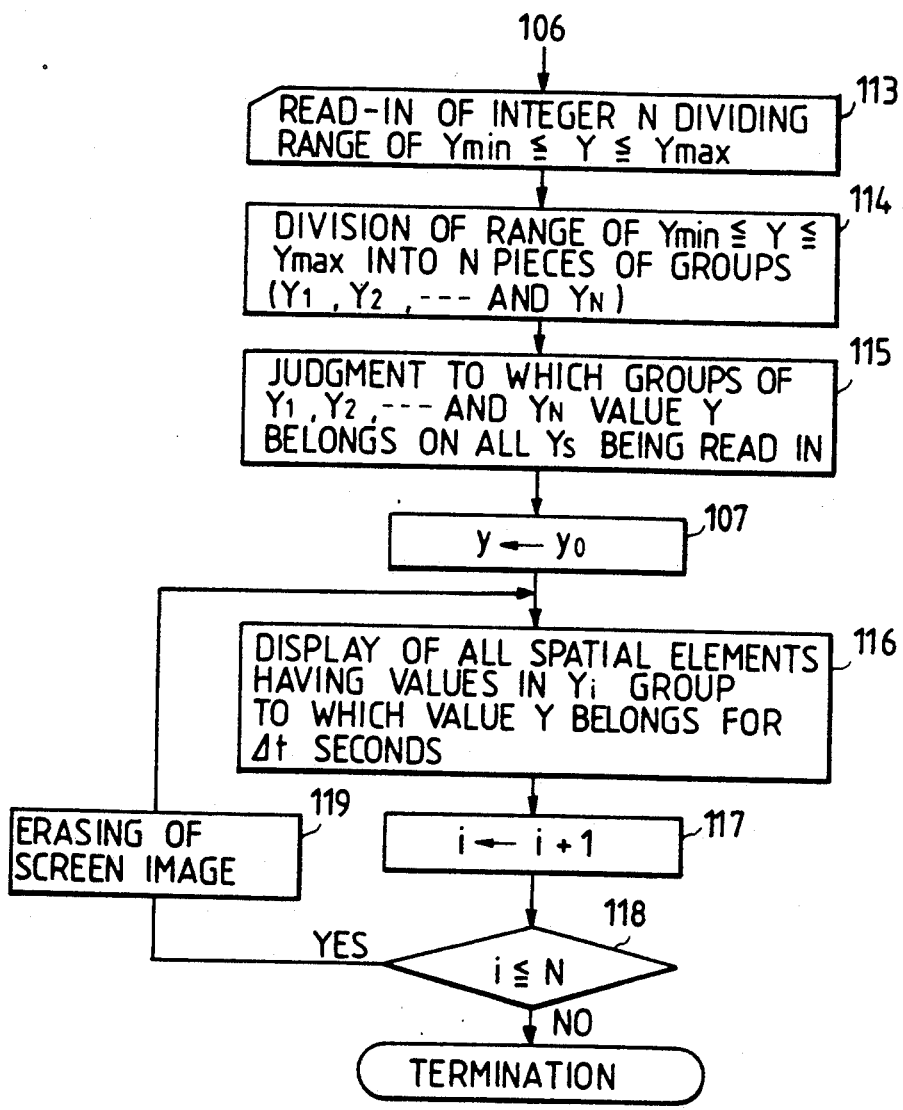
FIG. 2 is a flowchart showing a second embodiment of a display processing using a method according to the present invention.

FIG. 2 shows another embodiment of the present invention, wherein a portion of the processing 1 following step 106 in FIG. 1 is modified. In the present embodiment, following step 106 in FIG. 1, the region between $Y_{max}$ and $Y_{min}$ is divided into N pieces and, while successively changing the divided regions, all of the spatial positions are displayed of which physical quantities have the value equal to those in the respective divided regions. Namely, at first, the number of regions N to be divided of the value Y, the scope of which is indicated as follows, $$Y_{max} \geq Y \geq Y_{min}$$

is designated (step 113). Nextly the region between $Y_{min}$ and $Y_{max}$ is divided into N pieces of regions Y1, Y2 ... and Yn (step 114). Further here, when the size of the physical quantity is displayed in color or in a pattern, these respective N pieces of regions Y1, Y2 ... and Yn are related to the different colors or patterns. Next, to which of the divided region Y1, Y2 ... or Yn the value Y to be displayed belongs is judged (step 115). Next, among respective spatial elements which are divided and designated by a spatial mesh in the coordinate system on the display screen, all of the elements having the value Y included in the region $Y_i$ to which the value $Y_o$ belongs are displayed for $\Delta t$ seconds (step 107 and 116). The values which the spatial elements displayed in this instance have are not necessarily $Y_o$, and are in a predetermined band, the condition of the spatial distribution of the physical quantity $\phi$ having the value $Y_o$ can be materially comprehended by the picture image constituted by the spatial elements displayed. When the dividing number N is increased, a further accurate understanding of the configuration of the spatial distribution of $\phi$ is obtained. Next, for causing the spatial distribution having values Y larger than $Y_o$ to be displayed, the region $Y_{i+1}$ adjacent to the region $Y_i$ is selected, the spatial elements now displayed are erased and the spatial elements having values Y included in this region $Y_{i+1}$ are displayed (step 117-119). This operation is repeated until the spatial elements having values Y included in $Y_n$ ($Y_n$ is the region including $Y_{max}$) are displayed. As explained thus far, by successively changing the spatial elements caused to be displayed within the $\Delta t$ second interval, the three dimensional comprehension of the spatial distribution of the physical quantity $\phi$ becomes easy and the complicated processing using the sliced planes is eliminated.

Figure 3:
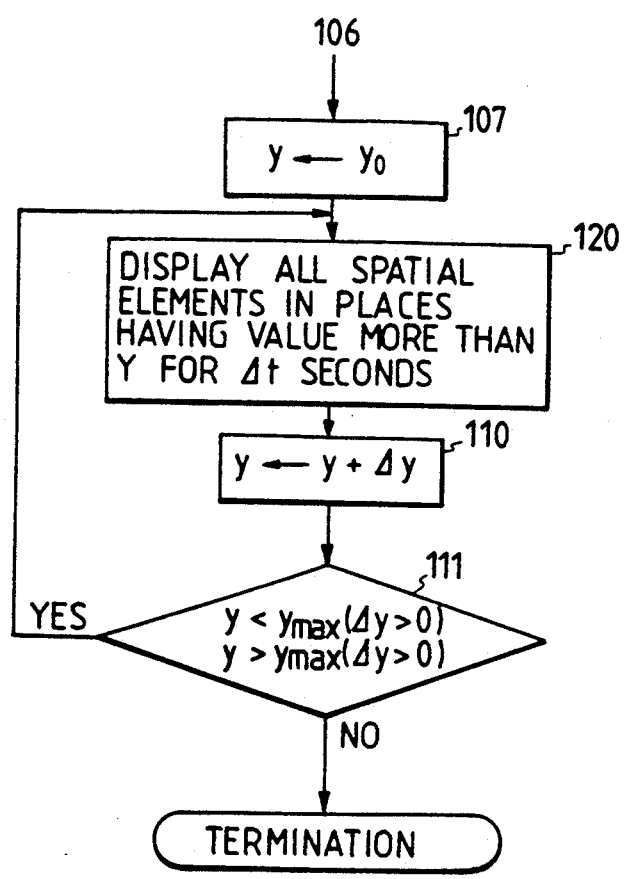
FIG. 3 is a flowchart showing a third embodiment of a display processing using a method according to the present invention.

FIG. 3 shows another embodiment of the present invention. While the embodiments shown in FIG. 1 and FIG. 2 are to be enabled to grasp the spatial distribution of $\phi$ by repeating such operation in which the values of the physical quantity $\phi$ or those near to Y are displayed, erased and those which correspond to Y next are displayed again, the present embodiment is enabled to grasp the three dimensional distribution of the physical quantity $\phi$ by repeating such operation in which at one time the spatial distribution of $\phi$ having values not less than $Y_o$ (or not more than) is displayed for a predetermined time, and the value of $Y_o$ is caused to increase (or decrease) and again to display the distribution for a predetermined time. The FIG. 3 embodiment is the same as that of FIG. 1 until a step 106, and in a step 107 the value of $Y_o$ is substituted into the work variable Y. Nextly, all of the spatial elements in the display coordinate system on the screen which have the physical quantity $\phi$ of the value not less than Y are displayed for $\Delta t$ seconds (step 120). In this instance, it helps visual understanding when the respective elements are displayed by suitable coloring or patterning according to the values of Y of which these respective elements have. Nextly, the operation in which the processing in the above step 120 is performed by causing the value of Y to increase by $\Delta Y$ is repeated until Y reaches $Y_{max}$ (or reaches $Y_{min}$) (step 110 and 111).

Figure 4A:
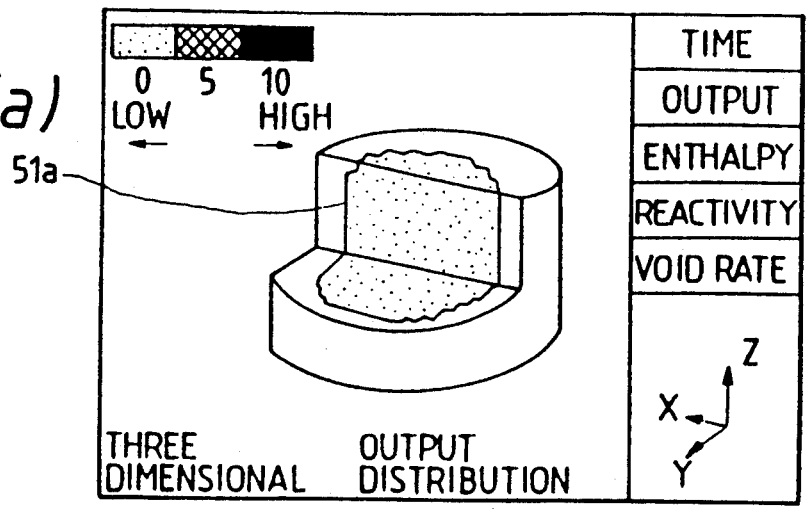
FIGS. 4(a)-(c) show display examples according to the embodiment in FIG. 3.
Figure 4B:
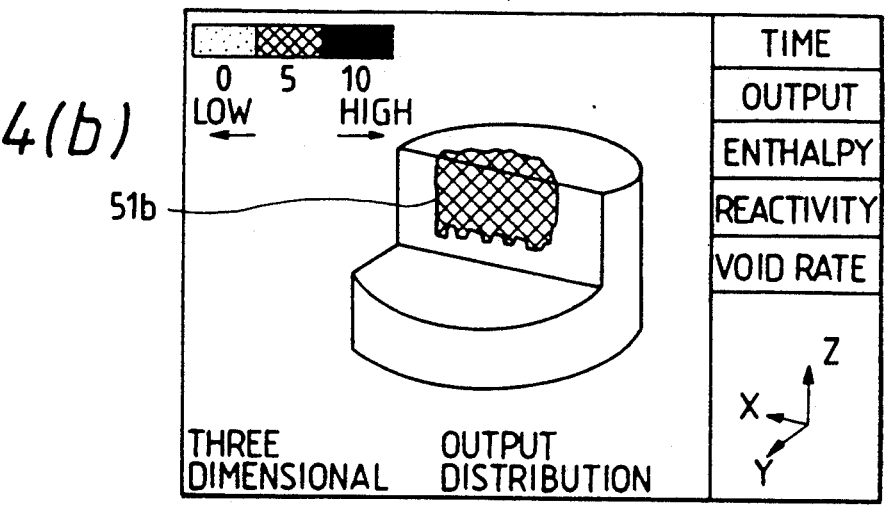
Figure 4C:
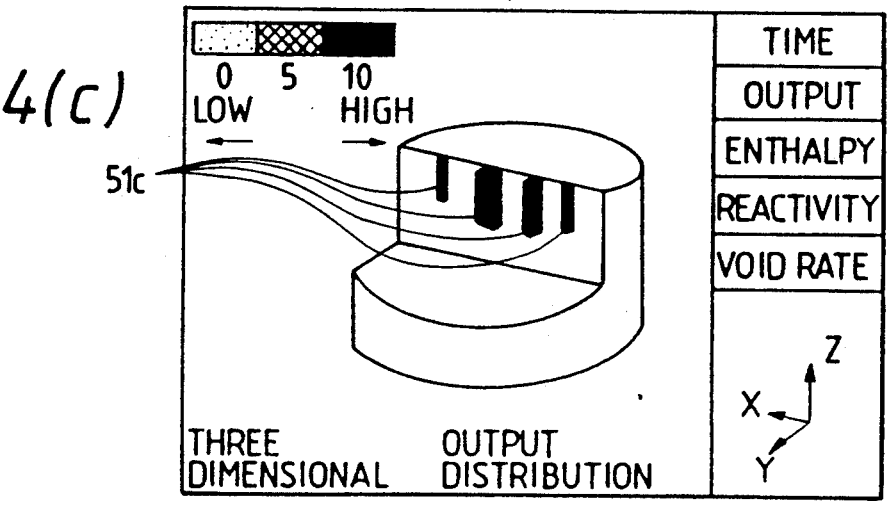

In the present embodiment, when the value of Y is caused to be successively increased, portions of the three dimensional physical quantity $\phi$ having small values successively disappear from the display screen and finally only the display of the spatial position having $Y_{max}$ remains. For example, assuming the output inside the reactor core of a nuclear reactor is taken as the physical quantity $\phi$, the displayed screen changes in the order from FIG. 4(a) to FIG. 4(c). Here the distributions 51a, 51b and 51c on the respective screens show the distribution when $Y \geq Ya$, $Y \geq Yb$ and $Y \geq Yc$ respectively, and $Ya \geq Tb \geq Yc$. When these displays are formed, for example, it is determined from the screen of FIG. 4(c) that the high output portions distribute near the center of the reactor core extending along the vertical axis direction. Further, from the screen in FIG. 4(a) it is determined that the outputs in the outside area of the reactor core are substantially the same in the longitudinal direction and in the lateral direction. In comparison with the conventional display method in which the sliced planes in the longitudinal direction or in the lateral direction are provided and how the respective output distributions corresponding to FIGS. 4(a), 4(b) and 4(c) are grasped only on the respective sliced planes, in the present embodiment by displaying the output in the reactor core while successively erasing the display images of the portions having a low output in the reactor core and causing the three dimensional distributions 51a–51c to be displayed successively at an appropriate time interval, an intuitive grasp and comprehension of the output distribution over the entire region in the reactor core is facilitated. Further, in a nuclear reactor fuel assembly in an object system for analysis when thermal allowance is selected as the physical quantity $\phi$ and the above display method is applied therefor, where thermally severe portions are produced in the complex assembly of fuel rods, water rods and spacers can be immediately understood, and portions having a thermal allowance can also be grasped over the entire region of the assembly, the present embodiment is useful for planning suitable improvements such as the improvement of flow distribution. In addition, the present embodiment is also used with the same effect for the display of such physical quantities as temperature, pressure, void rate, neutron flux and heat flux.

Figure 5:
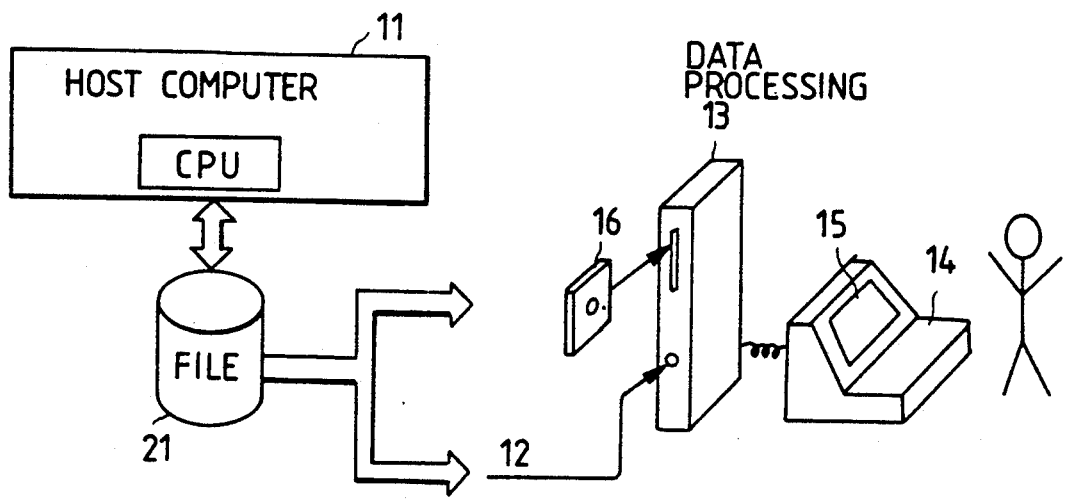
FIG. 5 is a block diagram showing an embodiment of a three dimensional physical quantity display device using a display method according to the present invention.

FIG. 5 shows an embodiment of a three dimensional physical quantity display device using a display method according to the present invention, and a calculation result obtained by a computer 11 which has a capacity capable of a large scaled physical calculation simulation for a physical quantity such as nuclear power, for example, stored in a data file 21. The computer 11 and the file 21 are connected with a work station or the minicomputer through a cable 12. The work station or the minicomputer is constituted of a keyboard 14, a display 15 and a data processing part 13, and has functions for executing the processing shown in FIG. 1–FIG. 3. The physical quantity data of the processing objects are transferred through the cable 12 from the data file 21 to the data processing part 13, or after the data in the data file 21 are copied in the data recording medium such as a magnetic tape and a floppy disk, they are set in the data processing part 13. A user inputs information such as an initial value $Y_0$ of a physical quantity $\phi$ desired to be displayed and display time $\Delta t$ from the keyboard 14. And then the display processings shown in FIG. 1–FIG. 3 are performed in the data processing part 13 and the screen images are displayed on the display 15. The processing sequences shown in FIG. 1–FIG. 3 may be input into the processing part 13 as a program, or an IC in which such program written beforehand may be provided.

Figure 6:
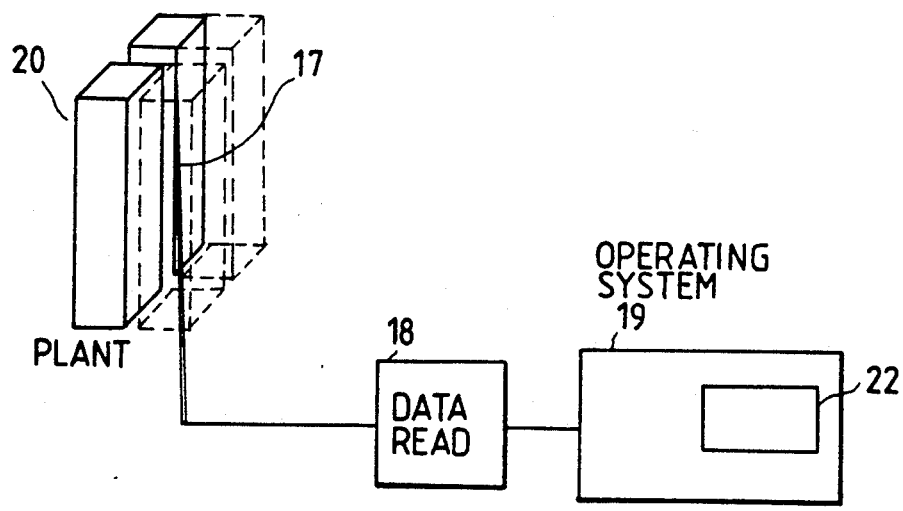
FIG. 6, is another block diagram showing an embodiment of a three dimensional physical quantity display device using a display method according to the present invention.

FIG. 6 shows a constitution of a plant monitoring device and the display method according to the present invention used for the display unit thereof. In a plant 20, for example a nuclear reactor, a measuring instrument 17 is provided, the process quantities observed by this instrument are processed through a data reading device 18, and displayed on the screen of a display 22 of a central control operating system 19. The central control operating system 19 has processing functions shown in FIG. 1–FIG. 3 and displays distributions of physical quantities such as measured output, temperature and pressure in a reactor core so as to be easily comprehended visually. Since in general the regions in the reactor core of a nuclear reactor where thermal conditions are severe are distributed in a complicated manner in the reactor core and the distribution pattern changes with time, if the present invention is applied for monitoring conditions of the reactor core in on-line, the three dimensional condition in the reactor core can be momentarily grasped without re-setting the sliced planes many times.

According to the present invention, processing necessitating the designation of a sliced plane and thereafter the calculation of distribution thereof for every one display is eliminated, and an advantage is obtained in that a three dimensional distribution display facilitating quick and easy visual comprehension is enabled.

What is claimed is:

1. A display method for displaying a three-dimensionally distributed physical quantity, said display method comprising the steps of:

dividing a value range corresponding to physical quantity values which are distributed in a three dimensional space into a plurality of small value ranges;

designating a particular one of said small value ranges so that the values belonging to said divided plurality of small value ranges successively increase or decrease with each designation;

obtaining all of the positions in said three dimensional space of which said physical quantity values are equal to the value in said designated particular small value range; and displaying said obtained positions on a display device for a predetermined time to thereby display a spatial distribution of said physical quantity values.

2. A display method for displaying a three-dimensionally distributed physical quantity according to claim 1, wherein the number of said physical quantity values is finite and said small value ranges respectively comprise ranges of one of the physical quantity values of said finite number.

3. A display method for displaying a three-dimensionally distributed physical quantity according to claim 1 or claim 2, wherein, in said obtaining step, all of the physical quantity values of the positions in said three-dimensional space are equal to or greater than the value in said designated particular small value range.

4. A display method for displaying a three-dimensionally distributed physical quantity according to claim 1 or claim 2, wherein, in said obtaining step, all of the physical quantity values of the positions in said three-dimensional space are equal to or less than the value in said designated particular small value range.

5. A display device for displaying a three-dimensionally distributed physical quantity comprising:

division means for dividing a value range corresponding to physical quantity values into a plurality of small value ranges when said physical quantity which is distributed in a three dimensional space is given;

designation means for designating a particular one of said small value ranges so that the values belonging to the small value ranges divided by said division means successively increase or decrease;

distribution calculation means for obtaining, whenever one small value range is designated by said designation means, all of the positions in said three dimensional space of which said physical quantity values are equal to the value in said designated particular small value range; and display means for displaying said obtained positions on a display device for a predetermined time.

6. A display device for displaying a three-dimensionally distributed physical quantity according to claim 5, wherein said distribution calculation means obtains all positions in said three-dimensional space of which said physical quantity values are equal to or greater than the value in said designated particular small value range.

7. A display device for displaying a three-dimensionally distributed physical quantity according to claim 5, wherein said distribution calculation means obtains all positions in said three-dimensional space of which said physical quantity values are equal to or less than the value in said designated particular small value range.

* * * * *